United States Patent [19]

Swearingin

[11] Patent Number: 4,508,061
[45] Date of Patent: Apr. 2, 1985

[54] NIPPLE FEEDER FOR DISPENSING DRY FEED

[76] Inventor: David Swearingin, R.R. 5, Carrollton, Mo. 64633

[21] Appl. No.: 551,938

[22] Filed: Nov. 15, 1983

[51] Int. Cl.³ ............................................. A01K 5/00
[52] U.S. Cl. .................................. 119/51 R; 119/71; 119/54
[58] Field of Search ................ 119/54, 52 AF, 56 R, 119/53, 51 R, 71, 75, 72.5, 70

[56] References Cited

U.S. PATENT DOCUMENTS

| | | | |
|---|---|---|---|
| 662,304 | 11/1900 | Armstrong | 119/71 |
| 1,046,938 | 12/1912 | Bacon | 119/70 |
| 3,033,164 | 5/1962 | Evers | 119/51 R |
| 3,113,556 | 12/1963 | Jarvis | 119/51 R |
| 3,374,772 | 3/1968 | Gilst et al. | 119/71 |
| 3,812,823 | 5/1974 | Ridder et al. | 119/54 |
| 4,162,683 | 7/1979 | Brooks | 119/51 R |

Primary Examiner—John J. Wilson
Assistant Examiner—Kris R. Schulze
Attorney, Agent, or Firm—Norman B. Rainer

[57] ABSTRACT

A feeding apparatus is provided for dispensing dry granular feed directly into a hog's mouth. The apparatus comprises a supply conduit, an elongated feed tube, an auger positioned within said feed tube, and an electric motor or pawl and ratchet mechanism for rotating the auger. A lever is positioned near the outlet of the feed tube, the dimensions and spacing of the lever and feed tube outlet being such as to permit engulfment by the hog's mouth. When the roof of the hog's mouth depresses the lever, the auger is activated to deliver feed.

4 Claims, 4 Drawing Figures

NIPPLE FEEDER FOR DISPENSING DRY FEED

BACKGROUND OF THE INVENTION

This invention relates to apparatus for feeding animals and, more particularly, to an automatic feeding apparatus which supplies dry feed by a mechanism activated by the animal as it feeds from the apparatus.

Devices for automatically feeding livestock are in widespread use. Most such devices supply feed to open containers from which the livestock eat. In such manner of operation, feed left in the open containers is not only wasted, but is subject to infestation by insect or microbial contamination which can lead to disease in the animals feeding from the containers.

Feeding devices which directly deposit feed into the animal's mouth by way of a nozzle or nipple type feed outlet have been disclosed for example in U.S. Pat. No. 3,374,772. Such systems, however, generally require that the feed be in a slurry form so that it can be advanced through the feeder by hydrostatic forces, and controlled by a valve mechanism. The difficulties encountered with slurry feeds are that they (a) require the extra step of preparation from dry feed, with its attendant increased equipment needs and shipping weight, (b) tend to leak from the feeder device, (c) undergo gravimetric sedimentation, forming dense consistencies which may clog dispensing mechanisms, and (d) are susceptible to rapid spoilage.

A feeding device may be said to be animal-controlled if some action by the animal controls an energy source such as a motor or valved storage bin which advances the feed. If the animal provides the energy necessary to advance the feed, the device may be further said to be animal-actuated. In animal-controlled feeding devices of the prior art, motor-driven auger mechanisms have been utilized to convey feed from a storage bin to a feeding outlet. The use of valved storage bins has generally been restricted to slurry feeds. One advantage of an animal-actuated device is that the device can be operated in remote outdoor locations not supplied with electricity. In animal-controlled and animal-actuated devices, the special behavioral and physical characteristics of the specific animal dictates design considerations of the feeding device.

It is accordingly an object of the present invention to provide an animal-controlled feeding device for use with dry feed.

It is another object of this invention to provide a device of the foregoing object which may be animal-actuated.

It is a further object of this invention to provide a device of the aforesaid nature which delivers feed directly to the mouth of a hog feeding at said device.

It is still another object of the present invention to provide a feeding device of the aforesaid nature of simple and rugged construction which may be economically manufactured.

These objects and other objects and advantages of the invention will be apparent from the following description.

SUMMARY OF THE INVENTION

The above and other beneficial objects and advantages are accomplished in accordance with the present invention by an improved feeding apparatus which comprises:

(a) a supply conduit adapted to receive solid granular feed at an open upper extremity, and discharge said feed at a lower extremity, (b) an elongated feed tube communicating with the lower extremity of said supply conduit and disposed in a substantially horizontal position, said tube having a substantially closed rearward extremity and a forwardly directed outlet extremity, (c) auger means rotatively positioned within said tube in coaxial alignment therewith (d) means to prevent axial movement of said auger means within said tube, (e) a shaft associated with said auger means and coaxially disposed therewith, (f) means for rotating said shaft, and (g) a spring-biased lever adapted for pivotal movement in a vertical plane, the forward extremity of said lever being disposed adjacent the forward extremity of said tube, and the rearward extremity of said lever being operatively associated with said means for rotating said shaft.

In one embodiment of the invention, the means for rotating the shaft is an electric motor, and the action of the motor is controlled by an on-off switch associated with the rearward extremity of the lower. In another, animal-actuated embodiment of the invention, the means for rotating the shaft is a pawl and ratchet mechanism driven by the movement of the rearward extremity of said lever.

The construction of the apparatus is such that a hog can engulf both the outlet extremity of the feed tube and the forward extremity of the lever with his mouth, and can strike the lever downwardly with the roof of his mouth to advance feed directly into his mouth. A storage hopper will generally be positioned to supply feed, preferably by gravity effect, to the supply conduit. The motor or pawl and ratchet mechanism may be protectively housed to exclude feed material. The entire apparatus may be mounted upon a supporting base or may be supported by attachment to adjacent feeding units. Suitable means may be utilized to protect the apparatus and feed contained therein from exposure to weather factors, particularly precipitation.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

Figure 1:
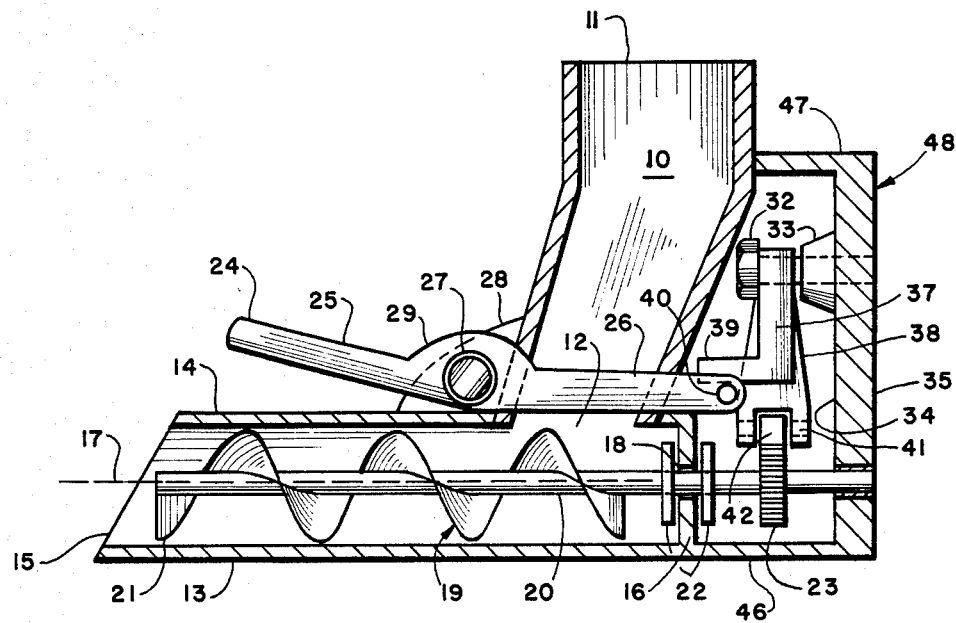
FIG. 1 is a sectional side view of an animal-actuated embodiment of the apparatus of the present invention.

For convenience in description, the terms "forward" and "rearward", or words of similar import, will have reference to the left and right sides respectively of the apparatus appearing in FIG. 1.

DESCRIPTION OF THE PREFERRED EMBODIMENT

Figure 2:
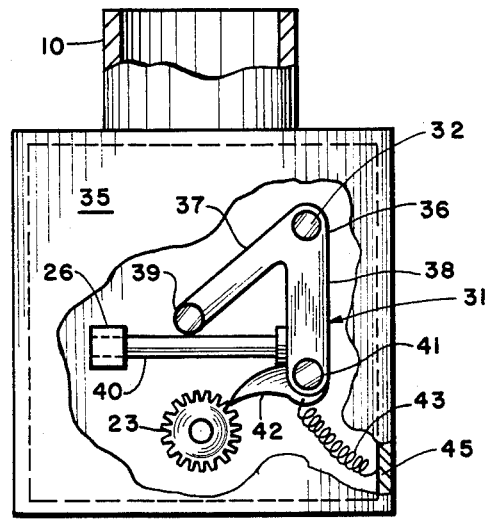
FIG. 2 is a view of the right end of the apparatus of FIG. 1 with parts broken away to reveal interior details.
Figure 3:
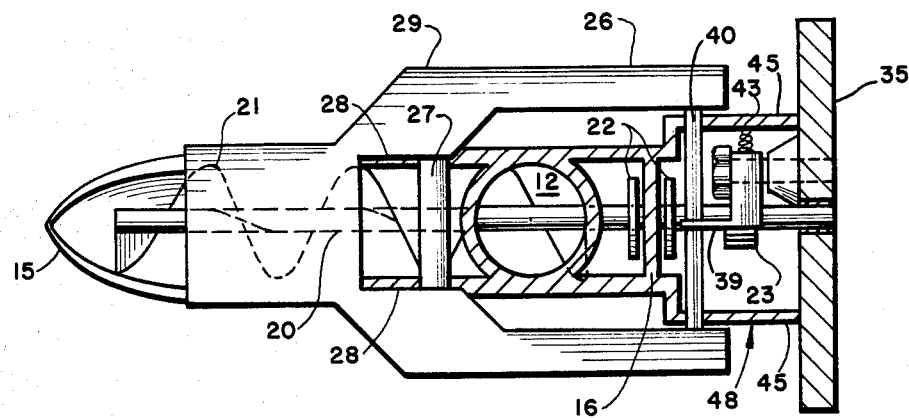
FIG. 3 is a top plan view of the apparatus of FIG. 1 with parts broken away to reveal interior details.

Referring to FIGS. 1-3, an apparatus of the present invention is shown comprised of a supply conduit 10 having an open upper extremity 11 and a lower discharge extremity 12 which communicates with an upper portion of horizontally disposed feed tube 13. Said tube is comprised of a circular cylindrical wall 14 having a center axis 17, a forwardly directed open outlet extremity 15, and a rear closure panel 16 perpendicularly disposed to axis 17 and provided with centered circular aperture 18. The rear portion of tube 13 is shown to merge with supply conduit 10 as a continuous integral extension thereof, as may be produced by a molding method of fabrication. A housing 48, comprised of rear wall 35, opposed sidewalls 45, floor 46 and roof 47, is associated with the rear extremity of tube 13, and may be constructed as a continuous integral extension of the tube and supply conduit components. Rear wall 35 or other portions of the housing may, however, be removable to facilitate access to the interior of the housing.

Auger means 19, comprised of continuous helical vane 21 affixed to centered shaft 21, is rotatively positioned within feed tube 13 in a manner such that shaft 20 is coaxial with axis 17. Shaft 20 passes through aperture 18 and is journaled to rear housing wall 35 shown as a continuous integral extension of the lower portion of tube 13. A pair of positioning collars 22 mounted upon shaft 20 on either side of closure panel 16 prevents axial movement of said auger within said tube. A toothed ratchet gear 23 is affixed to shaft 20 at a site between closure panel 16 and rear housing wall 35.

A control lever 24 comprised of forward striker plate 25, and bifurcated rear and intermediate yokes 26 and 29, respectively, is positioned above tube 13 by pivot pin 27 which extends through intermediate yoke 29 and engages apertured holding tabs 28 extending between tube 13 and conduit 10 in spaced-apart vertical planes. The general configuration and mounting of control lever 24 is such that, when a downward force is applied against striker plate 25, rear yoke 26 will undergo a forceful upward motion. When the downward force is released, the striker plate is restored to its upper position by the effect of spring-restoring means to be described hereinafter. The illustrated embodiment of control lever 24 has an angled configuration centered about pivot pin 27 which causes the striker plate, in its downward position, to be flush against the upper portion of tube 13. Such manner of construction minimizes the possibility that the striker plate will be broken when forcibly moved to its downward position.

A pawl mechanism 31 is pivotably attached by bolt 32 and interactive standoff 33 to the inside face 34 of rear housing wall 35. The pawl mechanism is comprised of pivotably supported rocker arm 36 having first and second downwardly disposed extensions 37 and 38 respectively. First extension 37 is equipped at its bottom extremity with a horizontally disposed bearing pin 39 adapted to rest upon activating pin 40 extending across rear yoke 26 of said control lever. The lowermost extremity of second extension 38 is bifurcated and provided with horizontally disposed pivot pin 41 which supports pawl 42. The size and placement of said pawl is such that its pointed extremity engages ratchet gear 23. A coilspring 43 is attached at its upper extremity to pawl 42. The lower extremity of the coilspring is attached to the inside face of sidewall 45, causing the spring to be in a tensioned state.

In operation, downward movement of striker plate 25 causes upward motion of activating pin 40 with attendant upward motion of bearing pin 39. Such upward motion of said bearing pin causes rocker arm 36 to exert downward force upon extension 38 and pawl 42, thereby causing rotational movement of gear 23 and auger means 19. The rotational movement of the auger causes feed to be transported from the discharge extremity 12 of supply conduit 10 toward outlet extremity 15 of feed tube 13. Upon removal of the downward force, coilspring 43 functions as restoring means to return the striker plate to its upper position and re-position the pawl for the next downward movement. Said restoring effect is achieved in a manner whereby said spring causes the rocker arm to press downwardly upon bearing pin 39 which in turn raises striker plate 25. Because the striker plate is in close proximity to outlet extremity 15, a hog can feed himself merely by pressing the striker plate with the underside of his upper jaw. In this manner, the hog's mouth engulfs both the striker plate and outlet extremity 15.

The general design of the apparatus is preferably such as to permit fabrication of the feed tube, supply conduit, holding tabs, and rear housing wall by the joinder to two halves, each cast or molded from thermoplastic resin, aluminum, or iron.

The apparatus is mounted upon auxiliary supporting structure in a manner such that the outlet extremity of the feed tube is at a convenient elevation above ground level. In a preferable manner of installation, the apparatus is positioned adjacent water-supplying apparatus, thereby permitting the hog to mix dry feed with water in his mouth.

Figure 4:
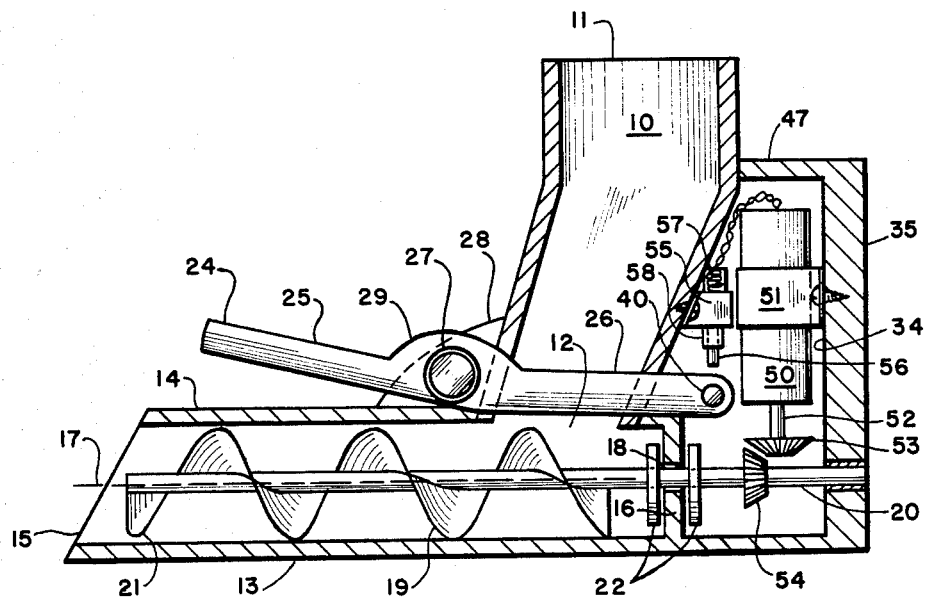
FIG. 4 is a sectional side view of an animal-controlled, motor actuated embodiment of the apparatus of this invention.

The apparatus of FIG. 4 differs from the embodiment of FIGS. 1-3 primarily insofar as the pawl and ratchet mechanism is replaced by an electric motor 50 held by harness 51 bolted to the inside face 34 of rear housing wall 35. The output spindle 52 of the motor is equipped with a bevel gear 53 adapted to interact with bevel gear 54 attached to shaft 20. An on-off electric switch device 55 is bolted to the exterior wall of supply conduit 10, and positioned generally above activating pin 40. A plunger 56 telescopically engages housing 58 of switch device 55, and a coilspring 57 within said housing resists upward movement of said plunger.

In operation, plunger 56 of the apparatus of FIG. 4 is driven upwardly by upward movement of activating pin 40. In its upward position, the plunger causes electrical activation of motor 50 which turns auger means 19. When downward force is removed from striker plate 25, spring 57 will restore control lever 24 to its inactive position and also de-activate motor 50. Other springs may be used in place of or to augment spring 57.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. An improved hog-feeding apparatus comprising:
    (a) a supply conduit adapted to receive solid granular feed at an open upper extremity, and discharge said feed at a lower extremity, (b) an elongated feed tube communicating with the lower extremity of said supply conduit and disposed in a substantially horizontal position, said tube having a substantially closed rearward extremity and a forwardly directed outlet extremity,
(c) auger means rotatively positioned within said tube in coaxial alignment therewith,
(d) means to prevent axial movement of said auger means within said tube,
(e) a shaft associated with said auger means and coaxially disposed therewith,
(f) means for rotating said shaft, and
(g) a spring-biased lever adapted for pivotal movement in a vertical plane, having a forward extremity disposed in sufficiently close juxtaposition to the forward extremity of said feed tube to permit engulfment of said juxtaposed forward extremities by a hog's mouth, and having a rearward extremity mechanically coupled to said means for rotating said shaft, whereby
(h) forceful depression of the forward extremity of said lever by a hog's mouth activates said means for rotating said shaft.

2. The apparatus of claim 1 wherein said means for rotating said shaft comprise a pawl and ratchet mechanism, the driving force for which is provided by the hog's forceful depression of the forward extremity of said lever.

3. The apparatus of claim 1 wherein said means for rotating said shaft comprise an electric motor and an on-off switch therefor, said on-off switch being controlled by movement of the rearward extremity of said lever.

4. The apparatus of claim 3 wherein said motor is active when the forward extremity of said lever is depressed and is inactive when said forward extremity is raised by spring action to an upward position.

* * * * *